United States Patent [19]

Choi

[11] Patent Number: 5,416,390
[45] Date of Patent: May 16, 1995

[54] CIRCUIT FOR DRIVING A LOADING MOTOR OF A VIDEO CASSETTE TAPE RECORDER

[75] Inventor: Joon H. Choi, Kyungki-do, Rep. of Korea

[73] Assignee: Goldstar Co., Ltd., Seoul, Rep. of Korea

[21] Appl. No.: 303,583

[22] Filed: Sep. 9, 1994

Related U.S. Application Data

[63] Continuation of Ser. No. 95,354, Jul. 20, 1993, abandoned, which is a continuation of Ser. No. 782,063, Oct. 24, 1991, abandoned.

[30] Foreign Application Priority Data

Oct. 26, 1990 [KR] Rep. of Korea .............. 17249/1990

[51] Int. Cl.$^6$ .............................................. H02P 5/00
[52] U.S. Cl. .................................... 318/434; 388/903
[58] Field of Search ........ 318/254, 138, 439, 220–286, 318/549, 601, 561, 256, 257, 798–812, 434; 388/814, 822, 903, 904, 909; 361/23, 30, 33

[56] References Cited

U.S. PATENT DOCUMENTS

| | | | |
|---|---|---|---|
| 3,694,720 | 9/1972 | Nakijima | 388/811 |
| 3,704,401 | 11/1972 | Miller | 318/59 |
| 4,031,442 | 6/1977 | Poppelreiter | 318/561 |
| 4,238,720 | 12/1980 | Rothman et al. | 318/800 |
| 4,337,426 | 6/1982 | Imamura | 318/599 |
| 4,353,020 | 10/1982 | Yeale | 318/601 |
| 4,375,611 | 3/1983 | Greig | 318/626 |
| 4,500,821 | 2/1985 | Bitting et al. | 318/254 |
| 4,638,230 | 1/1987 | Lee | 318/561 X |
| 4,714,867 | 12/1987 | Palmin et al. | 318/696 |
| 4,904,919 | 2/1990 | McNaughton | 318/798 |
| 5,061,884 | 10/1991 | Saganovsky | 318/431 |

Primary Examiner—Jonathan Wysocki
Attorney, Agent, or Firm—Ostrolenk, Faber, Gerb & Soffen

[57] ABSTRACT

A low noise loading motor drive circuit for a camera-integrated camcorder includes a rotation velocity detecting circuit for detecting a rotation number proportional to a velocity signal generated from the loading motor, a velocity signal strengthening amplifying unit for amplifying and strengthening the output signal from the rotation velocity detecting unit, and a velocity to voltage converting unit for converting the output signal from the velocity signal strengthening unit into a voltage inversely proportional to the velocity of loading motor. The circuit also includes a voltage limiting circuit for setting a rotation velocity range limited between a predetermined maximum rotation velocity and a predetermined minimum rotation velocity of loading motor, in a normal rotation made of loading motor. The voltage from velocity to voltage converting unit and the voltage limited output signal from voltage limiting circuit are summed by an adder. The output from adder is converted into an electric power by a voltage to velocity converting unit. The electric power is supplied to the loading motor via a motor drive circuit. With this arrangement, the rotation velocity of loading motor can be constant in loading/unloading operation, thereby removing annoying noise.

4 Claims, 4 Drawing Sheets

CIRCUIT FOR DRIVING A LOADING MOTOR OF A VIDEO CASSETTE TAPE RECORDER

This is a Continuation of application Ser. No. 08/095,354, filed Jul. 20, 1993, which is a continuation of application Ser. No. 07/782,063, filed on Oct. 24, 1991, both now abandoned.

BACKGROUND OF THE INVENTION

1. Field of the Invention

The present invention relates to a circuit for driving a loading motor of a video cassette tape recorder, and more particularly to a low noise loading motor drive circuit for a camcorder, capable of driving the loading motor of a cassette tape at a constant velocity and thus removing uncomfortable noise.

2. Description of the Background Art

A conventional circuit for driving a loading motor in a camera-integrated video cassette tape recorder(- hereinafter, referred to as a camcorder) is illustrated in FIG. 1A. As shown in the drawing, the circuit comprises a direct current power source DC of the camcorder, a constant voltage circuit 101 connected to the direct current power source DC and adapted to generate a constant voltage to be used as a voltage for driving a loading motor M, and a motor drive unit 102 adapted to supply the constant voltage from the constant voltage circuit 101 to the loading motor M, as its drive voltage. The motor drive unit 102 includes a rotation direction Control circuit for controlling the loading motor R to rotate in a normal direction CW or a reverse direction CCW, according to loading or unloading signals.

The motor drive circuit 102 is of a conventional type, comprising an integrated element. As shown in FIG. 1B, the constant voltage circuit 101 comprises a series NPN type power transistor TR101 for controlling a constant voltage and a zener diode ZD1 for supplying a reference voltage to the base of said transistor TR101 so as to predetermine a reference output of constant voltage.

The operation of the conventional loading motor drive circuit of camcorder is as follows.

Voltage from the power source DC of camcorder is converted into a constant voltage which is in turn supplied to the motor drive circuit 102. The motor drive circuit 102 supplies the constant voltage to the loading motor M as its drive voltage, according to a loading motor driving signal. At this time, the zener voltage from the zener diode ZD101 of the constant voltage circuit 101 is applied as a base voltage to the transistor TR101, so that the transistor TR101 supplies a constant voltage of a predetermined level corresponding to the amount of voltage at which the transistor TR101 turns on as determined by the zener voltage.

That is, the zener voltage of the zener diode ZD101 is set to the reference potential obtained by adding the voltage $V_{BE}$ between the base and the emitter of the transistor TR101 to the driving voltage of the loading motor M. By virtue of the zener voltage, a constant voltage of the level enabling a driving of loading motor M is outputted from the transistor TR101.

Thereafter, as loading or unloading of the cassette tape is controlled by the user, a loading control signal or an unloading control signal is applied to the rotation direction control circuit of the motor drive circuit 102. The rotation direction control circuit controls polarities of output voltages from the output terminals P1 and P2 of motor drive circuit unit 102, as P1 (+), P2 (−) or P1 (−), P2 (+). Accordingly, the loading motor M can rotate in the normal direction CW or the reverse direction CCW by the constant voltage from the constant voltage circuit 101.

On the other hand, FIG. 2 depicts the relationship characteristic of a load to a rotation velocity (RPM) of a small direct current motor. As shown in the drawing, the rotation velocity is inversely proportional to the load of overall mechanism.

For example, if the point B is assumed as a normal operation point, under the condition that a small direct current motor is used as loading motor M and a constant voltage is used as driving voltage, the point A is indicative of the position where the rotation velocity is increased according to the decreased load, while the point C the position where the rotation velocity is decreased according to the increased load. Thus, the rotation velocity has an inverse proportion characteristic to the load.

When controlling the loading of the overall mechanism by using a constant voltage, the load varies on the basis of the variation in the mechanical load as shown in FIG. 3A, and the loading motor M rotates at a relative rotation velocity that is inversely proportional to the load, as shown in FIG. 3B. As a result, the loading motor M does not rotate smoothly and regularly due to the load variation as shown in FIG. 3A. Such rotation irregularity results in vibration of a worm gear used as a reduction means for the loading motor and of a mechanism for supporting the worm gear, thereby irregular noise that is proportional to the variation of load occurs as show n in FIG. 3C.

SUMMARY OF THE INVENTION

Therefore, an object of the present invention is to provide a low noise loading motor drive circuit for a camcorder, capable of driving a loading motor at a constant velocity in loading a cassette tape and thus removing annoying noise.

In accordance with the present invention, this and other objects are achieved by providing a circuit for driving a loading motor in a camcorder comprising: a rotation velocity signal detecting unit adapted to detect a rotation velocity signal proportional to the rotation velocity of the loading motor; a velocity signal strengthening unit adapted to amplify and strengthen the small magnitude signal detected by the rotation velocity signal detecting unit; a velocity to voltage converting unit adapted to convert the output signal from the velocity signal strengthening unit into a voltage inversely proportional to the rotation velocity the loading motor; a voltage limiting circuit adapted to predetermine a rotation velocity range defined between a predetermined maximum rotation velocity and a predetermined minimum rotation velocity of the loading motor; an amplifying circuit adapted to sum the output voltage from the velocity to voltage converting unit and the voltage limited output signal from the voltage limiting circuit and to amplify the resulting signal; a voltage to electric power converting unit adapted to convert the output voltage from the amplifying circuit into an electric power; and a motor drive circuit adapted to drive the loading motor by the output electric power from the voltage to electric power converting unit and provided with a rotation direction control circuit.

BRIEF DESCRIPTION OF THE DRAWINGS

Other object and aspects of the invention will become apparent from the following description of embodiments with reference to the accompanying drawings in which:

FIGS. 3A to 3C are operation characteristic curves of the loading motor drive circuit shown in FIG. 1, wherein FIG. 3A depicts the variation of the load the loading motor which depends on the variation in mechanical load in loading or unloading operations, FIG. 3B depicts the variation of rotation velocity of the loading motor inversely proportional to the mechanical load in the loading or unloading operation, and FIG. 3C depicts the variation of generated noise which depends on the variation of rotation velocity of loading motor in loading or unloading operations;

DETAILED DESCRIPTION OF THE PREFERRED EMBODIMENTS

Figure 1A:
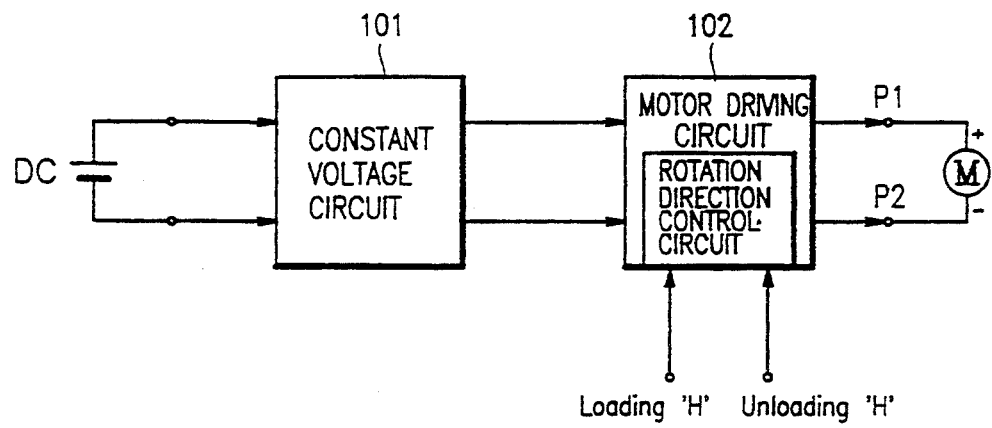
FIG. 1A is a block diagram of a circuit for driving a loading motor in a camcorder according to the prior art.
Figure 1B:
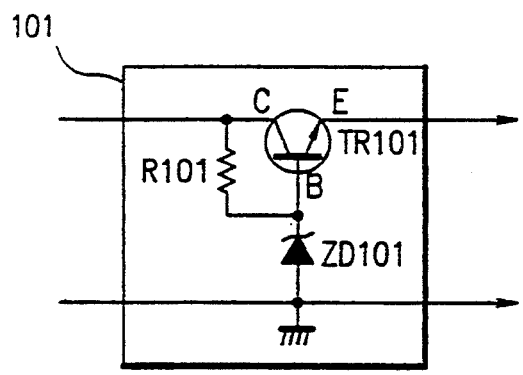
FIG. 1B is a circuit diagram of a constant voltage circuit unit shown in FIG. 1A.
Figure 2:
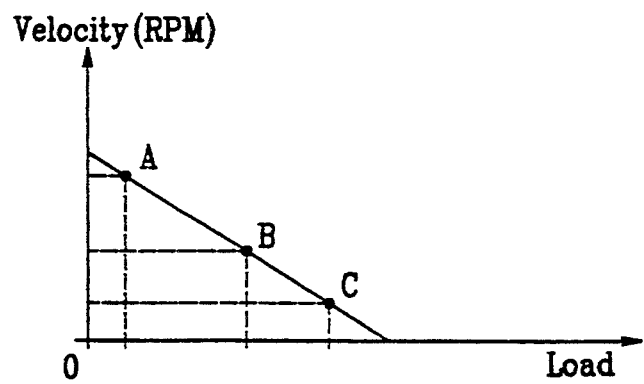
FIG. 2 depicts the relationship characteristic of a load to a rotation velocity (RPM) of a conventional small direct current motor.
Figure 3A:
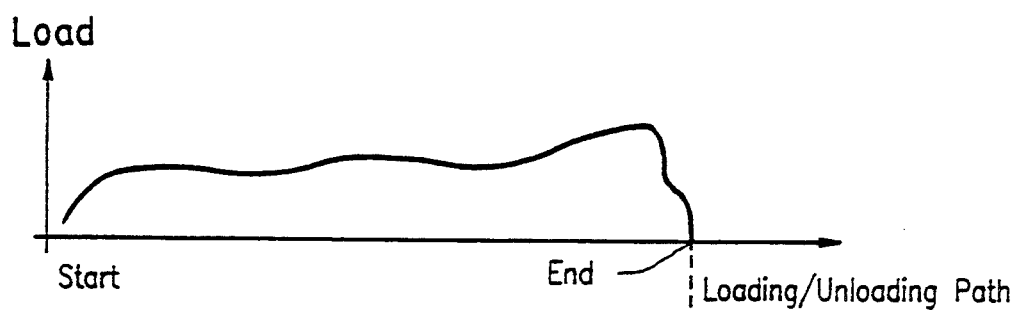
Figure 3B:
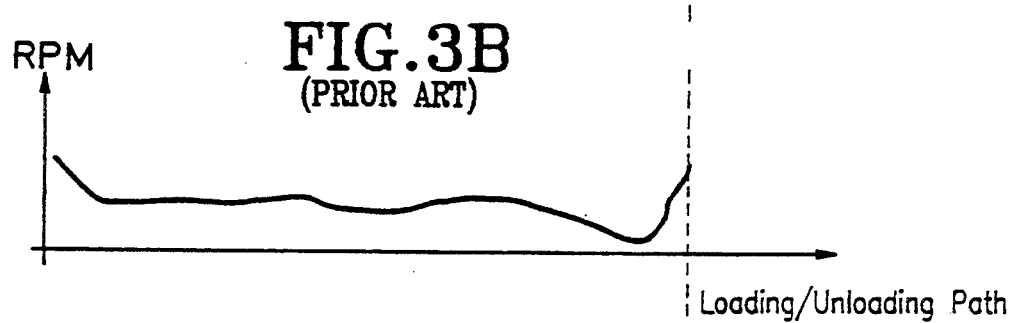
Figure 3C:
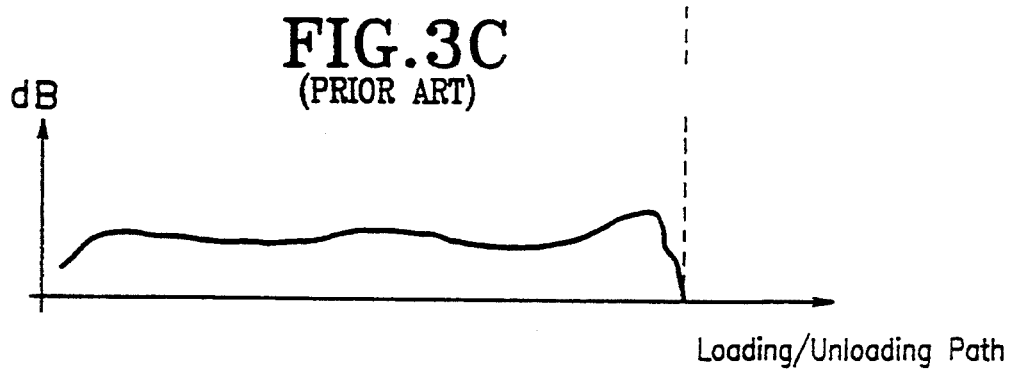
Figure 4:
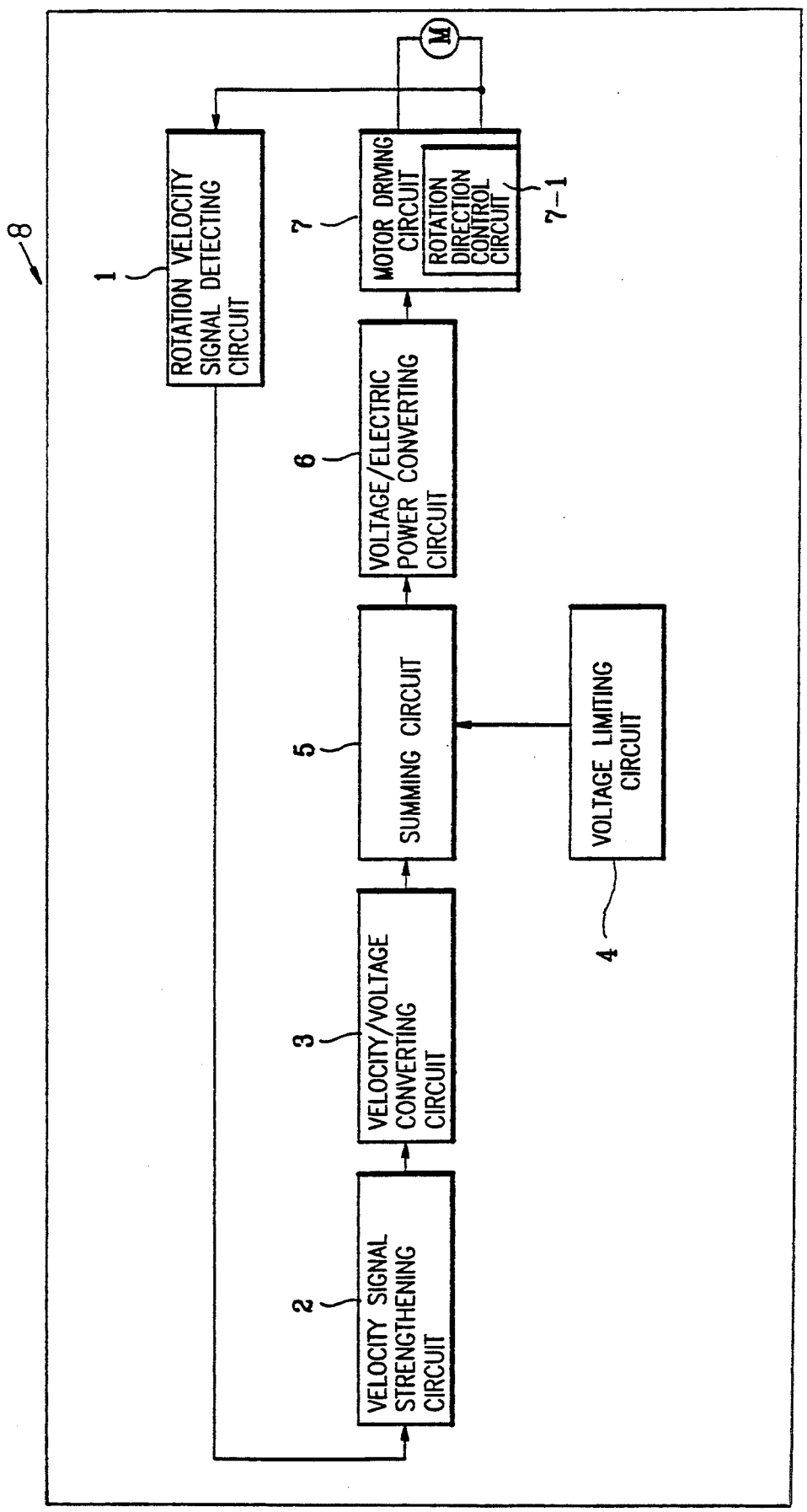
FIG. 4 is a block diagram of a low noise loading motor drive circuit of a camcorder in accordance with the present invention.

Referring to FIG. 4, there is shown a block diagram of low noise loading motor drive circuit of a video tape recorder 8 in accordance with the present invention. The circuit comprises a rotation velocity signal detecting unit 1 adapted to detect a rotation velocity signal proportional to the rotation velocity of a loading motor M, in the form of a rectangular wave, a velocity signal strengthening unit 2 adapted to shape the output signal from the signal detecting unit 1 into an accurate rectangular signal, a velocity to voltage converting unit 3 adapted to convert the output signal from the velocity signal strengthening unit 2 into a saw tooth wave, sample and hold the result signal and amplify the sampled and held signal as an output voltage, a voltage limiting circuit 4 adapted to predetermine a rotation velocity range defined between a predetermined maximum rotation velocity and a predetermined minimum rotation velocity of loading motor M and generating a limited output signal for maintaining the loading motor M at its stable rotation state, an amplifying circuit 6 adapted to sum the output signal from the velocity to voltage converting unit 3 having the voltage inversely proportional to the rotation velocity and the output signal from the voltage limiting circuit 4 and amplify the result signal, a voltage to electric power converting unit 6 adapted to convert the output voltage from the amplifying circuit 5 into an electric power, and a motor drive circuit 7 adapted to drive the loading motor M by the output electric power from the voltage to electric power converting unit 6 and provided with a rotation direction controller 7-1 so as to rotate the loading moron M in normal direction CW or reversed direction CCW according to the loading or unloading control of rotation direction controller 7-1.

Figure 5:
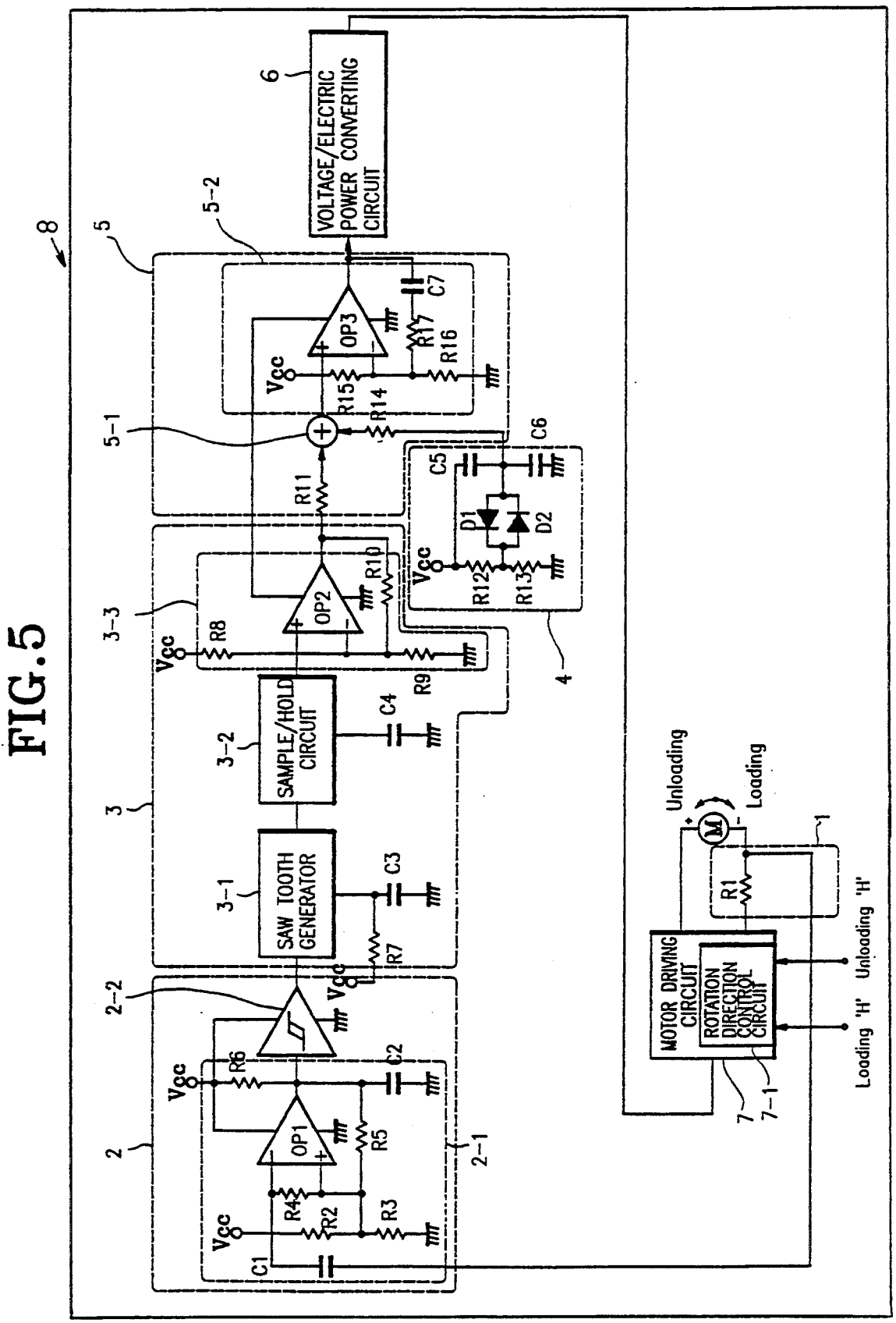
FIG. 5 is a circuit diagram of the low noise loading motor drive circuit shown in FIG. 4.

FIG. 5 is a detailed circuit diagram of the circuit shown in FIG. 4. As shown in FIG. 5, the rotation velocity signal detecting unit 1 is of conventional type which comprises a effect element(not shown) for detecting the number of rotation of the loading motor M and generating a rotation pulse signal FG. The rotation velocity signal detecting unit 1 also comprises a resistor R1 for detecting the rotation pulse signal FG from the hall element and generating a voltage having a frequency porportional to the number of rotation.

The velocity signal strengthening unit 2 comprises a comparator 2-1 connected to the output of the rotation velocity signal detecting unit 1 and adapted to compare the voltage therefrom indicative of the rotation velocity with a reference voltage and a schmidt trigger buffer 2—2 adapted to wave-shape the output signal from the comparator 2-1. In accordance with the present invention, the comparator 2-1 comprises a coupling condenser C1 connected at its one terminal to the output of rotation velocity signal detecting unit 1, so as to receive an output signal therefrom, an operational amplifier OP1 connected at its inverting terminal (−) to the other terminal of the coupling condenser C1 and at its non-inverting terminal (+) to the other terminal of the coupling condenser C1 via a resistor R4, and a resistor type potential divider provided with a pair of resistors R2 and R3 to divide the voltage from the power source Vcc and connected at the connection between the resistors R2 and R3 to the non-inverting terminal (+) of operational amplifier OP1 to apply the output voltage thereto. The output from the resistor type potential divider is also applied to a grounded condenser C2 and the output terminal of operational amplifier OP1, via a resistor R5. The output terminal of operational amplifier OP1 is connected with the power source Vcc via a resistor R6 so that the output therefrom is full up by the voltage from the power source Vcc and thus digitalized.

The velocity to voltage converting unit 3 comprises a saw tooth generator 3-1 adapted to the rotation velocity signal from the schmidt trigger buffer 2—2 of velocity signal strengthening unit 2 into a saw tooth signal, according to a time constant predetermined by a resistor R7 connected to the power source Vcc and a condenser C3, a sample and hold circuit 3-2 adapted to sample and hold the output signal from the saw tooth generator 3-1, via a sample and hold condenser C4, and a first amplifying unit 3—3 adapted to amplify the output from sample and hold circuit 3-2 and output the voltage inversely proportional to the number of rotation of the loading motor M. The first amplifying unit 3—3 comprises an operational amplifier OP2 connected at its non-inverting terminal (+) to the output of the schmidt trigger buffer 2—2. At the inverting terminal (−) of operational amplifier OP2, a resistor type potential divider is connected which includes a pair of resistors R8 and R9 to divide the voltage from the power source Vcc. The output of operational amplifier OP2 is fedback to the inverting terminal (−) of operational amplifier OP2, via a resistor R10.

On the other hand, voltage limiting circuit 4 is of a conventional type which comprises a resistor type potential divider including a pair of resistors R12 and R13 to divide the voltage from the power source Vcc and a pair of diodes D1 and D2 one having a cathode and an anode connected with the anode and the cathode of the other, respectively. The output from the potential divider OP2 is applied to the connection between the cathode of diode D1 and the anode of diode D2. On the other hand, the output from the connection between the anode of diode D1 and the cathode of diode D2 is applied to a condenser C5 connected to the power source Vcc as well as a grounded condenser C6. The output from the connection between the anode of diode D1 and the cathode of diode D2 is also applied as a voltage limited output signal.

The amplifying circuit 5 comprises a connecting point 5-1 adapted to receive a voltage from the velocity to voltage converting unit 3 inversely proportional to the rotation velocity of loading motor M via a resistor R11 and the voltage limited output signal from the voltage limiting circuit unit 4 and sum them, and a second amplifying unit 5-2 adapted to amplify the output from the connecting point 5-1. The second amplifying unit 5-2 comprises an operational amplifier OP3 connected at its non-inverting terminal (+) to the output of the connecting point 5-1. At the inverting terminal (−) of operational amplifier OP3, a resistor type potential divider is connected which includes a pair of resistors R15 and R16 to divide the voltage from the power source Vcc. The output from the resistor type potential divider is also applied to the output terminal of operational amplifier OP3, via a resistor R17 and a condenser C7.

The voltage to electric power converting unit 6 and the motor drive circuit 7 are of conventional type.

In accordance with the illustrated embodiment of the present invention, the saw tooth generating circuit 3-1, the sample and hold circuit 3-2 and the amplifying unit 3—3 of the velocity to voltage converting unit 3 comprises frequency to voltage converting integrated elements.

The operation of the circuit according to the present invention will now be described in detail.

As a voltage from the power source Vcc is applied to the drive circuit at initial operation, the first amplifying unit 3—3 of the velocity to voltage converting unit 3 outputs a maximum voltage for driving the loading motor M, since no signal is applied to the inverting terminal (−) of the operational amplifier OP2. Thereafter, the connecting point 5-1 of the amplifying circuit 5 sums the output voltage from the velocity to voltage converting unit 3 and the voltage limited output from the voltage limiting circuit 4. The resultant voltage is amplified by the second amplifying unit 5-2 of the amplifying circuit 5, so as to have a proper frequency characteristic. The amplified voltage is then applied to the voltage to electric power converting unit 6 and converted into an electric power is supplied to the motor drive circuit 7 which, in turn, rotates the loading motor M, according to the power polarity control of the rotation direction control unit 7-1 depending on the loading or unloading control.

Thereafter, when the loading motor M initially rotates according to the loading or unloading control, the rotation velocity signal detecting unit 1 detects, at its resistor R1, the voltage having the frequency FG corresponding to the rotation velocity of loading motor M. This voltage is applied to the comparator 2-1 of the velocity signal strengthening unit 2 and then to the inverting terminal (−) of operational amplifier OP1. The operational amplifier OP1 compares the rotation velocity signal applied to its inverting terminal (−) with the reference voltage predetermined by the potential divider consisting of resistors R2 and R3, resisters R4 and R5 and the condenser C2. Then, the operational amplifier OP1 generates an output voltage which has been amplified from a small magnitude of several tens mVpp (herein, Vpp is a peak to peak voltage) to high and low potentials of logic level. Thereafter, the digitalized rotation velocity frequency element outputted from the comparator 2-1 is shaped, by the schmidt trigger buffer 2—2, into a rectangular signal in which the pulses have sharply defined rising and falling edges.

The velocity signal wave-shaped in the velocity signal strengthening unit 2 is then converted into a saw tooth signal by the saw tooth generator 3-1 of the velocity to voltage converting unit 3 and according to the time constant predetermined by the resistor R7 and the condenser C3. The generated saw tooth signal is sampled and held by the sample and hold circuit 3-2.

As the rectangular frequency signal corresponding to the velocity signal is converted into the saw tooth signal and then sampled and held, it is converted into a voltage signal of direct current level inversely proportional to the rotation velocity. This output voltage signal from the sample and hold circuit 3-2 is amplified by the operational amplifier OP2 which is gain controlled with respect to the reference value by resistors R8 to R10.

The velocity to voltage converting unit 3 determines the period of frequency element corresponding to the rotation velocity of loading motor M, with respect to the reference voltage Vcc/2. When the number of rotation of the loading motor M is higher than the frequency corresponding to the time constant predetermined by the resistor R7 and the condenser C3, the output voltage having a frequency lower than that of the reference voltage Vcc/2 occurs. On the other hand, if the number of rotations of the loading motor M is identical to the frequency corresponding to the time constant predetermined by the resistor R7 and the condenser C3, the output voltage having a frequency identical to that of the reference voltage Vcc/2 occurs. That is, the output voltage which is inversely proportional to the number of rotations of loading motor M is generated.

On the other hand, the voltage limiting circuit 4 which comprises resistors R12 and R13, diodes D1 and D2 and condensers C5 and C6 generates an output voltage of 2.5+0.6 V, if the condensers C5 and C6 have the same capacity and the diodes D1 and D2 have also the same capacity. In this case, the voltage limiting circuit 4 generates a voltage limited output which is a frequency signal having a maximum voltage of 3.1 V and a minimum voltage of 1.9 V.

Therefore, the output voltage from the velocity to voltage converting unit 3 which is inversely proportional to the rotation velocity and the voltage limited output from the voltage limiting circuit unit 4 are summed in the connecting point 5-1. The resultant output from the connecting point 5-1 is applied to the non-inverting input terminal (+) of the operational amplifier OP3 of second amplifying unit 5-2. Since the operational amplifier OP3 has at its inverting terminal (−) a gain predetermined to have a characteristic of output voltage frequency by the resistors R15 to R17 and the condenser C7, it generates an output voltage which is a control voltage that is inversely proportional to the number of rotations of loading motor M enabling the rotation of loading motor M within the stable range in which maximum and minimum rotation velocities of loading motor are predetermined.

Since the output voltage from the operational amplifier OP3 is a short-period voltage controlled output, the voltage to electric power converting unit 6 supplies a motor-driving enabling electric power to the motor drive circuit 7 according to its current amplification and its direct current to direct current conversion. The motor drive circuit 7 rotates the loading motor M in the normal direction or the reverse direction by using the electric power from the voltage to electric power converting unit 6 and under the control of the rotation direction control unit 7-1 according to the loading or unloading control.

As apparent from the above description, the loading motor is controlled by the electric power which is inversely proportional to the rotation velocity of the loading motor, in accordance with the present invention, so that the rotation velocity of loading motor can be constantly controlled, irrespective of the load variation. By virtue of the constant rotation velocity of loading motor, there is no irregular loading or unloading noise. This is advantageous where the magnitude of noise is important, as in camcorders. In addition, there is no problem that loading or unloading time is varied, depending on the wound length of tape. In accordance with the present invention, the drive electric power of loading motor is supplied by the voltage electric power converting circuit. In the case that the consumed time of battery is important, accordingly, there is an advantage of reducing the consumed electric power, over the conventional motor drive circuit.

Although the preferred embodiments of the invention have been disclosed for illustrative purpose, those skilled in the art will appreciate that various modifications, additions and substitutions are possible, without departing from the scope and spirit of the invention as discloded in the accompanying claims.

What is claimed is:

1. A circuit for driving a loading motor for a video tape recorder comprising:

rotation velocity signal detecting means for detecting a rotation velocity signal proportional to a rotation velocity of the loading motor;

velocity signal strengthening means for amplifying and strengthening a small magnitude signal detected by said rotation velocity signal detecting means;

velocity to voltage converting means for converting the output signal from said velocity signal strengthening means into a voltage inversely proportional to the rotation velocity of the loading motor;

voltage limiting means for setting a rotation velocity range between a predetermined maximum rotation velocity and a predetermined minimum rotation velocity of the loading motor;

amplifying means for generating an output signal by summing the output voltage from said velocity to voltage converting means and a voltage limited output signal from said voltage limiting means and amplifying the resulting signal, said amplifying means comprising a connecting point adapted to sum the voltage from said velocity to voltage converting means and a voltage limited output signal from said voltage limiting means and an amplifier adapted to amplify an output signal from said connecting point;

voltage to electric power converting means for converting the output of said amplifying means into an electric power output; and motor driving means for driving the loading motor by the electric power output of said voltage to electric power converting means.

2. A circuit in accordance with claim 3, wherein said velocity signal strengthening means comprises a comparator for comparing the rotation velocity signal detected by said rotation velocity signal detecting means with a reference value and a schmidt trigger buffer adapted to wave-shape the output signal from said comparator.

3. A circuit in accordance with claim 1, wherein said velocity to voltage converting means comprises a saw tooth generator for converting an output signal of said velocity signal strengthening means into a saw tooth signal, according to a predetermined time constant, a sample and hold circuit adapted to sample and hold an output signal of said saw tooth generator, and a first amplifying means for amplifying an output from said sample and hold circuit and for outputting a voltage inversely proportional to the number of rotations of the loading motor, said first amplifying means including an operational amplifier.

4. A circuit in accordance with claim 3, wherein said saw tooth generator, said sample and hold circuit and said operational amplifier of the velocity to voltage converting means comprise frequency to voltage converting integrated elements.

* * * * *